United States Patent
Sekii et al.

(10) Patent No.: US 6,667,989 B1
(45) Date of Patent: Dec. 23, 2003

(54) METHOD AND DEVICE FOR CONTROLLING VIRTUALLY CONCATENATED CHANNELS

(75) Inventors: Ryohei Sekii, Kawasaki (JP); Hiroshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/300,950

(22) Filed: Apr. 28, 1999

(30) Foreign Application Priority Data

Jul. 2, 1998 (JP) .......................................... 10-187458

(51) Int. Cl.$^7$ ................................................. H04J 3/16
(52) U.S. Cl. ........................................ 370/465; 370/907
(58) Field of Search ................................. 370/907, 464, 370/465, 536

(56) References Cited

U.S. PATENT DOCUMENTS

| 5,168,494 A | | 12/1992 | Mueller | |
|---|---|---|---|---|
| 6,021,112 A | * | 2/2000 | Sugawara | 370/222 |
| 6,058,119 A | * | 5/2000 | Engbersen et al. | 370/466 |
| 6,262,975 B1 | * | 7/2001 | Derbenwick et al. | 370/244 |
| 6,266,345 B1 | * | 7/2001 | Huang | 370/468 |
| 2002/0012141 A1 | * | 1/2002 | Traverso | 359/124 |

FOREIGN PATENT DOCUMENTS

| EP | 0 486 874 | 5/1992 | |
|---|---|---|---|
| EP | 0 901 306 | 8/1998 | |
| EP | 0 969 617 A2 | * 5/2000 | H04J/3/16 |
| JP | 4-115747 | 4/1992 | |
| JP | 4-168841 | 6/1992 | |
| JP | 5-183528 | 7/1993 | |
| JP | 5-336066 | 12/1993 | |
| JP | 6-29956 | 2/1994 | |
| JP | 6-97975 | 4/1994 | |
| JP | 7-135673 | 5/1995 | |
| JP | 11-154922 | 6/1999 | |

OTHER PUBLICATIONS

Dumortier et al. "Transport of Gigabit ATM cell Streams over Lower Order SDH Backbone." Infocom '94. Network for Global Communications., 13$^{th}$ proceeding IEEE. Jun. 12–16, 1994. pp. 1160–1167.*

Parr et al. "Reducing ATM Cell Processing in SDH Multiplexors." IEEE Africon, 1996. Sep. 24–27$^{th}$, 1996. pp. 118–123.*

* cited by examiner

*Primary Examiner*—Chi Pham
*Assistant Examiner*—Derrick W Ferris
(74) *Attorney, Agent, or Firm*—Katten Muchin Zavis Rosenman

(57) ABSTRACT

A method of controlling virtually concatenated channels includes the steps of a) distributing a signal to a plurality of channels in an SDH network so as to transmit the signal, and b) providing information at a predetermined position within each one of the channels or at predetermined positions within multi-frames containing an entirety of the channels, the information indicating whether a corresponding one of the channels is concatenated.

11 Claims, 21 Drawing Sheets

S O H : SECTION OVERHEAD
P O H : PATH OVERHEAD
A U : ADMINISTRATIVE UNIT
V C-4 : VIRTUAL CONTAINER 4

FIG. 3

STM-1

| A1 | A1 | A1 | A2 | A2 | A2 | C1 | | | ⊠ | ⊠ |
|---|---|---|---|---|---|---|---|---|---|---|
| B1 | | | E1 | | | — | | | ⊠ | ⊠ |
| D1 | | | B2 | | | D3 | | | — | — |
| AU POINTER ||||||||||
| B2 | B2 | K1 | | | | K2 | | | | |
| D4 | | | D5 | | | D6 | | | | |
| D7 | | | D8 | | | D9 | | | | |
| D10 | | | D11 | | | D12 | | | | |
| Z1 | Z1 | Z1 | Z2 | Z2 | Z2 | E2 | | | ⊠ | ⊠ |

⊠ : USAGE CAN BE DEFINED COUNTRY BY COUNTRY
— : CURRENTLY UNUSED

FIG. 4

| SOH | FUNCTION |
|---|---|
| A1, A2 | FRAME SYNCHRONIZATION |
| C1 | ASSIGNING NUMBER TO STM-1 FOR IDENTIFICATION PURPOSE |
| B1 | ERROR MONITORING |
| E1 | AUDIO MEETING LINE |
| F1 | MAINTENANCE CHANNEL |
| D1, D2, D3 | DATA TRANSFER CHANNEL |
| B2 | MULTIPLEX-SECTION ERROR MONITORING |
| K1, K2 | LINE SWITCH CONTROL |
| D4~D12 | DATA TRANSFER CHANNEL |
| Z1 | SYNCHRONIZATION QUALITY LEVEL |
| Z2 | RESERVED |
| E2 | AUDIO MEETING LINE |

FIG. 6

| POH | FUNCTION |
|---|---|
| J1 | PATH TRACE |
| B3 | PATH-ERROR MONITORING |
| C2 | INDICATING SIGNAL TYPES OF SIGNALS CONSTITUTING VC |
| G1 | ALARM TRANSFER |
| F2, Z3 | PATH-MAINTENANCE/ ADMINISTRATION CHANNEL |
| H4 | INDICATING POSITION OF PAYLOAD SIGNAL |
| Z4 | RESERVED |
| Z5 | NETWORK-MAINTENANCE/ ADMINISTRATION CHANNEL |

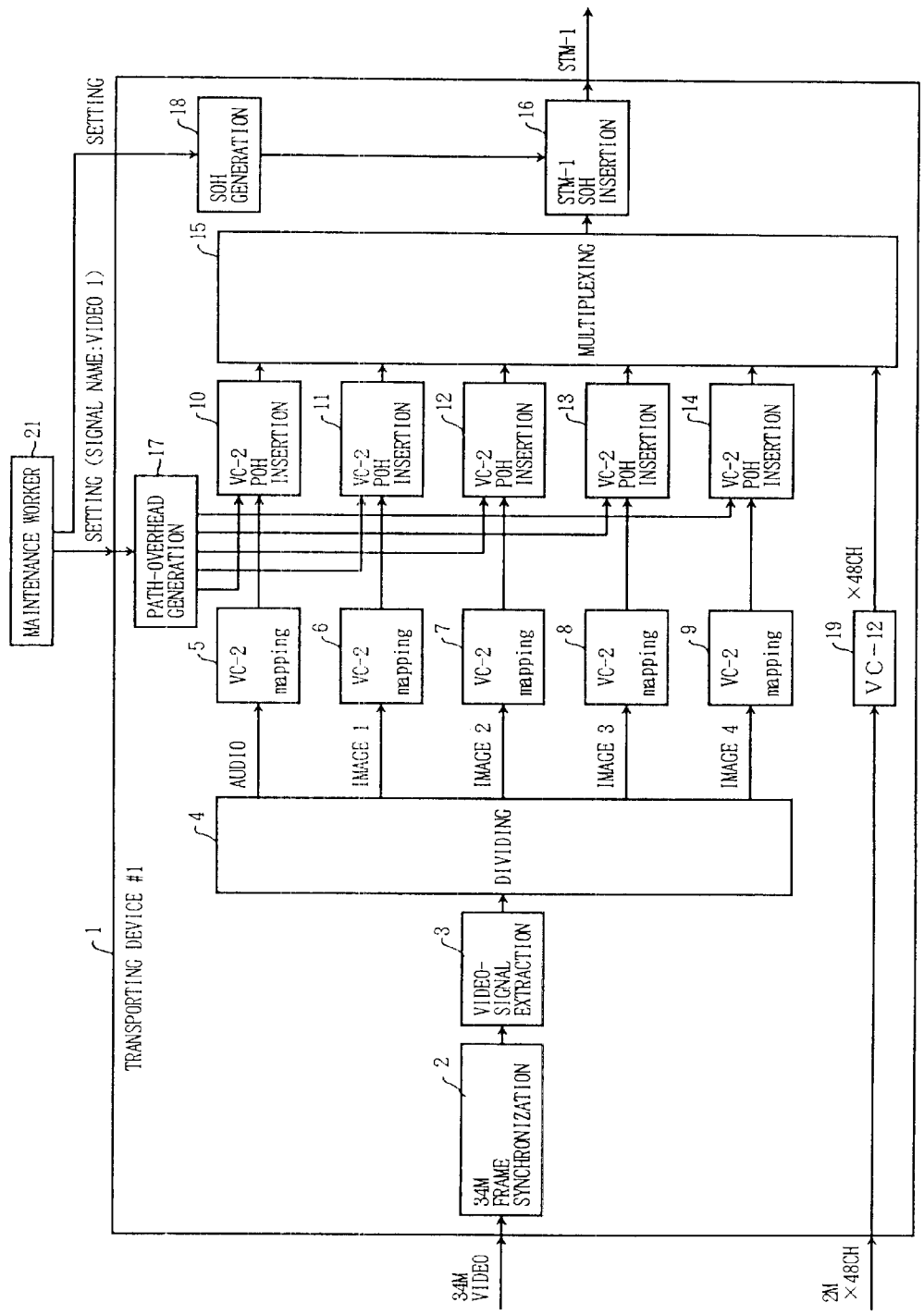

FIG. 10A  CH1 : VIDEO1_CH1_CH5
                         ‾‾‾ ‾‾‾
                    CHANNEL'S OWN   TOTAL NUMBER
                    CHANNEL NUMBER  OF CHANNELS

FIG. 10B  CH2 : VIDEO1_CH2_CH5

FIG. 10C  CH3 : VIDEO1_CH3_CH5

FIG. 10D  CH4 : VIDEO1_CH4_CH5

FIG. 10E  CH5 : VIDEO1_CH5_CH5

FIG. 13A    CH1 :    0001  0101

CHANNEL'S OWN    TOTAL NUMBER
                     CHANNEL NUMBER   OF CHANNELS

FIG. 13B    CH2 :    0010  0101
FIG. 13C    CH3 :    0011  0101
FIG. 13D    CH4 :    0100  0101
FIG. 13E    CH5 :    0101  0101
FIG. 13F  NON-CONCATENATED CH :  0000  0000

FIG. 14

| FRAME NUMBER | VC-12 | VC-2 |
|---|---|---|
| 1 | ch1 | ch1 |
| 2 | ch2 | — |
| 3 | ch3 | — |
| 4 | ch4 | ch2 |
| 5 | ch5 | — |
| 6 | ch6 | — |
| 7 | ch7 | ch3 |
| . | | |
| . | | |
| . | | |
| 61 | ch61 | ch21 |
| 62 | ch62 | — |
| 63 | ch63 | — |

CHANNEL'S OWN    TOTAL NUMBER
         CHANNEL NUMBER  OF CHANNELS

CH2 :   0 0 0 0   0 0 0 0 (NO CONCATENATION)

CH3 :   0 0 1 1   0 1 0 1

CH4 :   0 1 0 0   0 1 0 1

CH5 :   0 1 0 1   0 1 0 1
            .
            .
            .

(NO SECOND CHANNEL FOR CONCATENATION)

FIG. 21

CH1 : <u>0 0 0 1</u>　<u>0 1 0 1</u>　　EQUIP

CHANNEL'S OWN　TOTAL NUMBER
　　　　CHANNEL NUMBER　OF CHANNELS

CH2 :　　0 0 1 0　　0 1 0 1　　UNEQ

CH3 :　　0 0 1 1　　0 1 0 1　　EQUIP

CH4 :　　0 1 0 0　　0 1 0 1　　EQUIP

CH5 :　　0 1 0 1　　0 1 0 1　　EQUIP

⋮

METHOD AND DEVICE FOR CONTROLLING VIRTUALLY CONCATENATED CHANNELS

BACKGROUND OF THE INVENTION

1. Field of the Invention

The present invention relates to management of virtual concatenated channels and a transporting device for management of virtual concatenated channels where a signal is transmitted by distributing the signal in a plurality of channels in an SDH network.

2. Description of the Related Art

As high-speed data-transfer devices have been integrated into synchronous networks, an SDH (synchronous digital hierarchy) is now adopted as a global standard. A basic bit rate of the SDH is 155.52 Mbps, and a faster data transfer is available by using a multiple of the basic bit rate. A signal at the basic bit rate is referred to as synchronous-transport module 1 (STM-1). A signal transmitted at N times the basic bit rate is referred to as STM-N.

FIG. 1 is an illustrative drawing showing rules of multiplexing in the SDH.

FIG. 1 shows rules of multiplexing containers C-11 (1,544 kbps), C-12 (2,048 kbps), C-2 (6,312 kbps), C3 (44,736 kbps, 34,368 kbps), and C-4 (139,264 kbps) so as to become STM-N, which is N times the basic bit rate. These containers contain digital signals to be multiplexed.

In the figure, virtual containers VC-n (VC-11, VC-12, VC-2, VC-3, and VC-4) are comprised of a container and a path overhead attached thereto. A path overhead is used for error detection, network maintenance, etc. Tributary units TU-n (TU-11, TU-12, TU-2, TU-3, and TU-4) and administrative units AU-n (AU-3 and AU-4) are comprised of a virtual container and a pointer attached thereto for indicating a beginning of the virtual container. Further, tributary unit groups TUG-n (TUG-2 and TUG-3) are comprised of one or more tributary units.

FIG. 2 is an illustrative drawing showing a frame configuration of an STM-1 which has virtual containers VC-4 as a payload.

The STM-1 is comprised of 270 bytes by 9 rows. 9 bytes at the beginning together form a SOH (section overhead), and the following 261 bytes are the payload of the STM-1. The section overhead is used for maintenance and administration purposes to control section layers. A VC-4 includes therein a path overhead and the 149.76-Mbps payload thereof.

FIG. 3 is an illustrative drawing showing a configuration of the section overhead of the STM-1. The symbol "–" indicates a byte position that is currently unused. The section overhead is generated with respect to each transit transporting device. An AU pointer indicates a position of a beginning of a virtual container, which is included in the payload of STM-1.

FIG. 4 is a table showing a function assigned to each byte of the section overhead shown in FIG. 3. The present invention makes use of the unused portions of the section overhead, and has little to do with those portions which have established functions. A description of these functions, therefore, will be omitted.

As described above, the virtual containers have a path overhead attached thereto.

FIG. 5 is an illustrative drawing showing a path overhead of the virtual container VC-4.

A path overhead (VC-4POH) of the virtual container VC-4 is comprised of 1 byte by 9 rows FIG. 6 is a table showing a function assigned to each byte of the path overhead.

As shown in the table, a J1 byte has a path-trace function, and a C2 byte has a function of indicating a signal type with regard to signals constituting the virtual container VC. In detail, the J1 byte includes information stored therein regarding a path. A network administrator has a latitude to some extent in writing the contents of the J1 byte, with a requirement that a 16-byte message be used based on a multi-frame configuration. The C2 byte indicates signal types with regard to signals constituting the virtual containers to be multiplexed. By referring to the virtual container VC, it is possible to check whether the virtual container is EQUIP or UNEQ. This serves as an EQUIP/UNEQ signal of the virtual container VC.

According to the standard, the path overhead of the virtual container VC-2 is different from the path overhead of the virtual container VC-4. Since no significant difference exists in the basic functions, however, the path overhead of the virtual container VC-2 can be interpreted and understood in the same manner as interpreting the pass overhead of the virtual container VC-4.

FIG. 7 is an illustrative drawing showing a case in which a video signal of 34 Mbps is transmitted as an SDH signal in an SDH network.

When the video signal is transmitted by using virtual containers VC-2, the signal is first converted into an SDH signal by a transporting device #1, and is sent via transporting devices #2 and #4 to a transporting device #3, where the signal is converted back to the original video signal. The video signal thus obtained is output from the transporting device #3.

FIG. 8 is a block diagram of a related-art transporting device.

A video signal, which is multiplexed in synchronism with 34-MHz frames, has a frame synchronization established by a frame-synchronization circuit 2, and, then, is extracted by a video-signalextraction circuit 3. The extracted video signal is divided into an audio signal and video images IMAGE1 through IMAGE4 based on frequency bands thereof by a dividing circuit 4. The audio signal and video images are subjected to mapping by VC-2 mapping circuits 5 through 9, respectively, and have a path overhead (VC-2POH) attached thereto by VC-2POH-insertion circuits 10 through 14, respectively. This creates virtual containers VC-2. A multiplexing circuit 15 multiplexes the virtual containers VC-2 and another virtual container VC-12. The multiplexed signal is then provided with a section overhead (STM-1SOH) by an STM-1SOH-insertion circuit 16, resulting in an STM-1.

In a related-art transmission scheme, when a large amount of data is distributed to a plurality of channels, each divided chunk of data needs to be transmitted via the same network route in order to reconstruct the original data readily on the receiver side.

In FIG. 7, for example, a single video signal is divided into 5 virtual containers VC-2. If the 5 virtual containers VC-2 travel the same route to reach the transporting device #3, there is no problem in reconstructing the video signal. However, if some of the 5 virtual containers VC-2 travel through the transporting device #4 and others travel through the transporting device #2, the video signal reaching the transporting device #3 will have a different arrival time and a different signal level, depending on the route it takes. As a result, the transporting device #3 needs to attend to timing adjustment as well as level adjustment in order to compensate for route differences.

In order to obviate this problem, route settings need to be made so as to insure that chunks of data distributed to a plurality of channels are transmitted through the same network route. There is no method known in the field, however, to check such route settings easily as to whether they are correctly set.

Accordingly, there is a need for a scheme which makes it possible to easily check whether route settings are correctly made in a virtual concatenated transmission when data is distributed to a plurality of channels in an SDH network.

SUMMARY OF THE INVENTION

Accordingly, it is a general object of the present invention to provide a scheme which satisfy the need described above.

It is another and more specific object of the present invention to provide a method and a device which make it possible to easily check whether route settings are correctly made in a virtual concatenated transmission when data is distributed to a plurality of channels in an SDH network.

In order to achieve the above object according to the present invention, a method of controlling virtually concatenated channels includes the steps of a) distributing a signal to a plurality of channels in an SDH network so as to transmit the signal, and b) providing information at a predetermined position within each one of the channels or at predetermined positions within multi-frames containing an entirety of the channels, the information indicating whether a corresponding one of the channels is concatenated.

In the method described above, concatenation information on a given channel is provided at a predetermined position in the given channel or at a predetermined position in multi-frames. Because of this arrangement, a transporting device which receives the signal can compare the concatenation information with the current communication-line settings, and detects an error in the communication-line settings when there is a mismatch. This enables a transporting device to check whether all the channels are being transmitted via the same route as required by the line settings. Further, a check can be made at each transporting device as to whether there is an error in the line settings.

According to another aspect of the present invention, the method as described above is such that the step b) provides the information at a path trace of a path overhead of each channel.

In the method described above, a path overhead, which is defined by a standard, is utilized so as to carry the concatenation information. This makes it possible to detect a line-setting error as easily as in the previously described method while staying within the boundary of the standard.

According to another aspect of the present invention, the method as described above is such that the step b) provides the information at an unused portion of a path overhead of each channel.

In the method described above, a path overhead, which is defined by a standard, is utilized so as to carry the concatenation information. This makes it possible to detect a line-setting error as easily as in the previously described method while staying within the boundary of the standard.

According to another aspect of the present invention, the method as described above is such that the step b) provides the information at an unused portion of a section overhead of multi-frames containing the entirety of the channels.

In the method described above, a section overhead, which is defined by a standard, is utilized so as to carry the concatenation information. This makes it possible to detect a line-setting error as easily as in the previously described method while staying within the boundary of the standard.

According to another aspect of the present invention, the method as described above further includes the steps of receiving at a receiver the signal distributed to the plurality of channels, comparing the information included in the received signal with EQIP/UNEQ signals included in path overheads of the plurality of channels, and signaling an alarm if the comparison finds a mismatch.

In the method described above, an error in the concatenation information is easily detected by checking a consistency between the concatenation information included in the section overhead and the EQIP/UNEQ signals included in the path overheads and by signaling an alarm if there is inconsistency.

According to another aspect of the present invention, the method as described above further includes the steps of receiving at a receiver the signal distributed to the plurality of channels, comparing the information included in the received signal with communication-line settings, and signaling an alarm if the comparison finds a mismatch.

In the method described above, an error in the communication-line settings is easily found by comparing the information included in the received signal with the communication-line settings and by signaling an alarm if the comparison finds a mismatch. This also serves to find an line-setting error at each transporting device.

According to another aspect of the present invention, the method as described above is such that the signal is a 34-Mbps video signal, and the plurality of channels are VC-2 virtual containers, the multi-frames including STM-1 frames.

In the method as described above, only five virtual containers VC-2 are necessary whereas seven virtual containers VC-3 would be needed if the 34-Mbps signal were to be included in VC-3 virtual containers.

According to another aspect of the present invention, a device for controlling virtually concatenated channels includes distributing means for distributing a signal to a plurality of channels in an SDH network so as to transmit the signal, and information providing means for providing information at a predetermined position within each one of the channels or at predetermined positions within multi-frames containing an entirety of the channels, the information indicating whether a corresponding one of the channels is concatenated.

According to another aspect of the present invention, the device as described above is such that the information providing means provides the information at a path trace of a path overhead of each channel.

According to another aspect of the present invention, the device as described above is such that the information providing means provides the information at an unused portion of a path overhead of each channel.

According to another aspect of the present invention, the device as described above is such that the information providing means provides the information at an unused portion of a section overhead of multi-frames containing the entirety of the channels.

According to another aspect of the present invention, a device for controlling virtually concatenated channels in an SDH network includes dividing circuit which divides a signal to a plurality of channels, a first overhead-generation circuit which attaches a first overhead to each of the channels, the first overhead includes information indicating whether a corresponding one of the channels is concatenated, multiplexing circuit which multiplexes the plurality of channels with the first overhead attached thereto to generate a frame, and a second overhead-generation circuit which attaches a second overhead to the frame.

According to another aspect of the present invention, a device for controlling virtually concatenated channels in an SDH network includes dividing circuit which divides a signal to a plurality of channels, a first overhead-generation circuit which attaches a first overhead to each of the channels, multiplexing circuit which multiplexes the plurality of channels with the first overhead attached thereto to generate multi-frames, and a second overhead-generation circuit which attaches second overheads to the multi-frames, the second overheads includes information indicating whether a corresponding one of the channels is concatenated.

According to another aspect of the present invention, a device for checking communication-line settings in an SDH network includes a concatenation-information detection circuit which obtains concatenation information from a signal that is received, the signal being distributed to a plurality of channels prior to receipt thereof and including the concatenation information provided at a predetermined position within each one of the channels or at predetermined positions within multi-frames containing an entirety of the channels, the information indicating whether a corresponding one of the channels is concatenated, a communication-line setting resister which stores current communication-line settings, and a matching circuit which compares the concatenation information with the current communication-line settings, and signals an alarm when the comparison finds a mismatch.

The devices described above are so configured as to practice a corresponding one of the methods previously described.

Other objects and further features of the present invention will be apparent from the following detailed description when read in conjunction with the accompanying drawings.

BRIEF DESCRIPTION OF THE DRAWINGS

FIG. 3 is an illustrative drawing showing a configuration of a section overhead of the STM-1;

FIG. 4 is a table showing a function assigned to each byte of the section overhead shown in FIG. 3;

FIG. 6 is a table showing a function assigned to each byte of the path overhead;

FIG. 9 is a block diagram of a transporting device to which a transmission terminal is connected according to a first embodiment of the present invention;

FIGS. 10A through 10E is an illustrative drawing showing examples of concatenation information described in a path trace of each channel;

FIGS. 13A through 13F are illustrative drawings showing a signal configuration in which concatenation information is sent by using one byte in each channel;

FIG. 14 is an illustrative drawing showing a 64-frame multi-frame configuration;

FIG. 19 is an illustrative drawing for explaining a situation where an alarm goes off;

FIG. 21 is an illustrative drawing for explaining cases in which an alarm goes off according to the fifth embodiment.

DESCRIPTION OF THE PREFERRED EMBODIMENTS

In the following, embodiments of the present invention will be described with reference to the accompanying drawings.

First Embodiment

FIG. 9 is a block diagram of a transporting device to which a transmission terminal is connected according to a first embodiment of the present invention.

Figure 1:
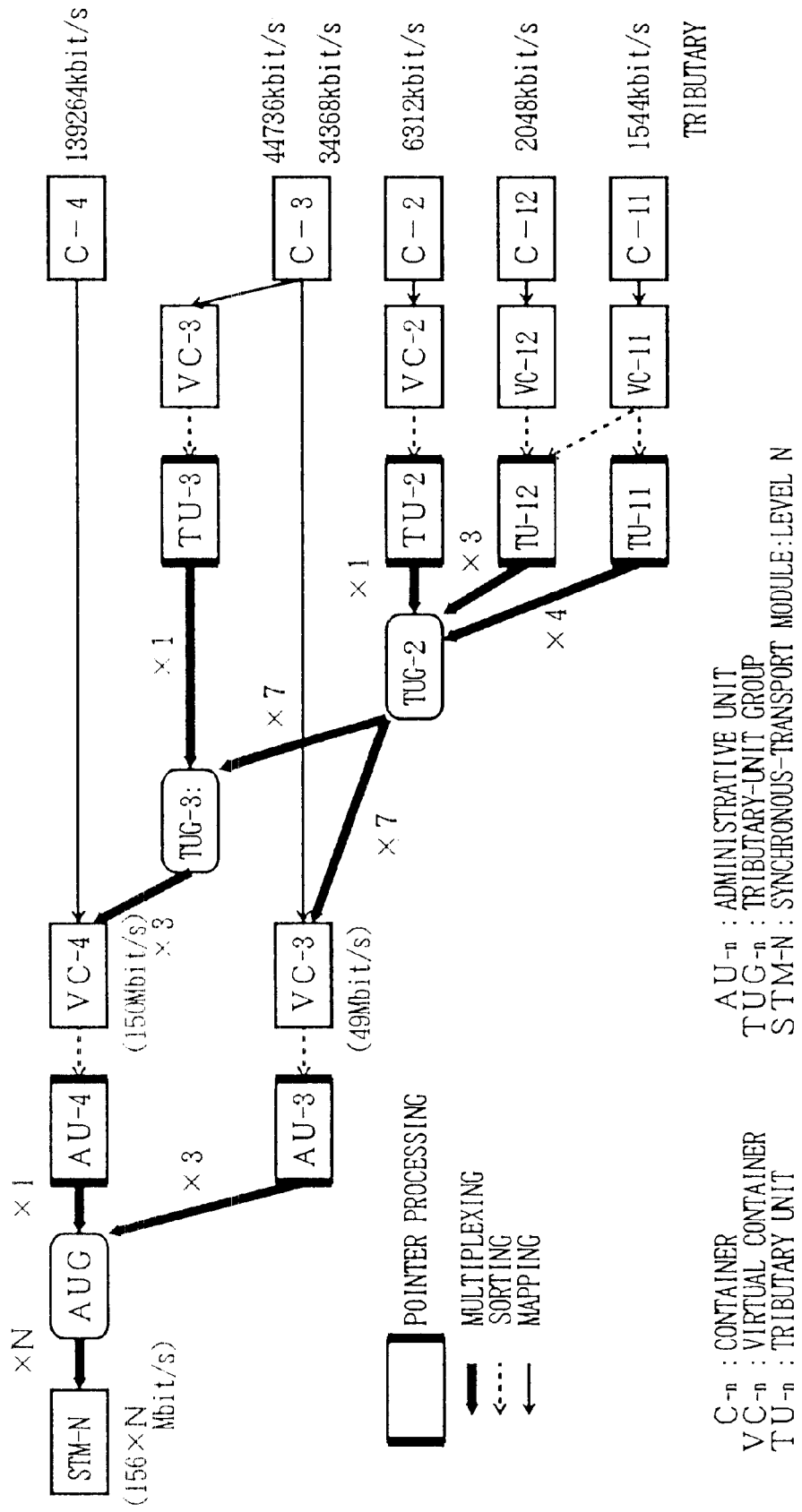
FIG. 1 is an illustrative drawing showing rules of multiplexing in the SDH.
Figure 2:
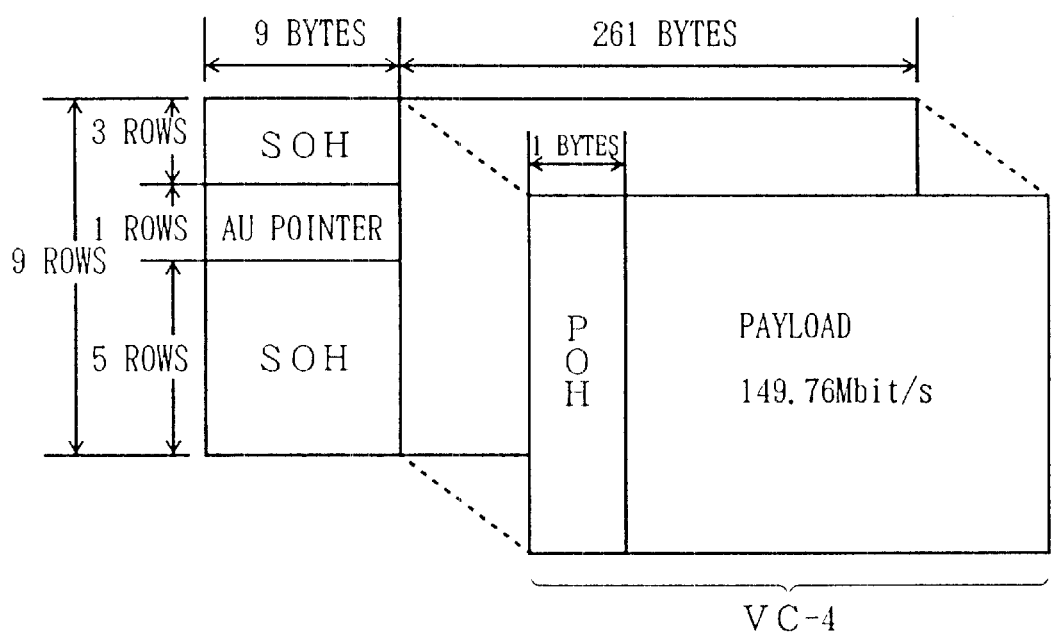
FIG. 2 is an illustrative drawing showing a frame configuration of an STM-1 which has virtual containers VC-4 as a payload.
Figure 5:
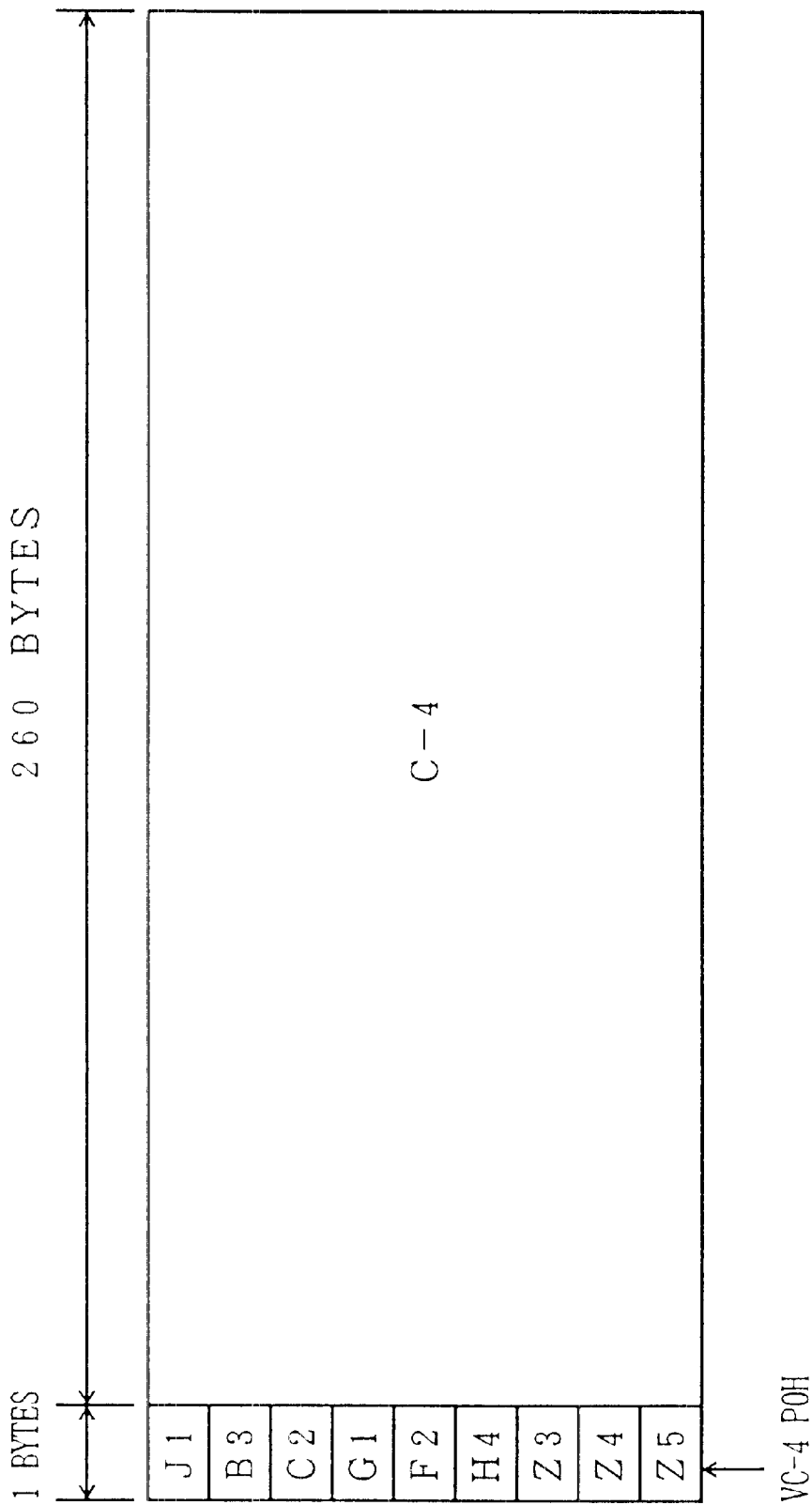
FIG. 5 is an illustrative drawing showing a path overhead of a virtual container VC-4.
Figure 7:
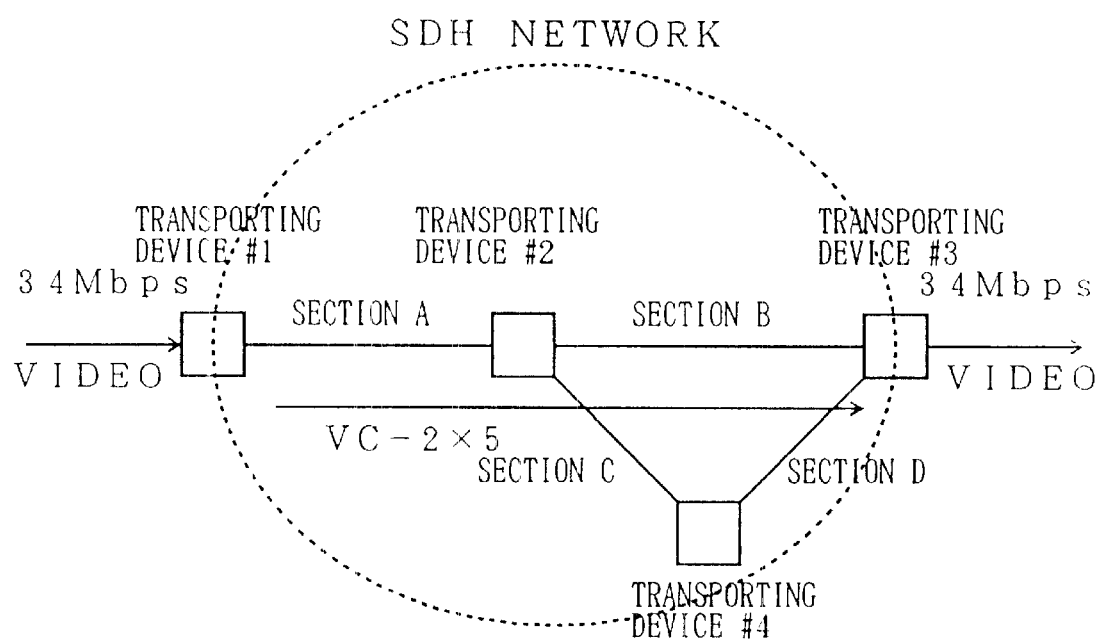
FIG. 7 is an illustrative drawing showing a case in which a video signal of 34 Mbps is transmitted as an SDH signal in an SDH network;.
Figure 8:
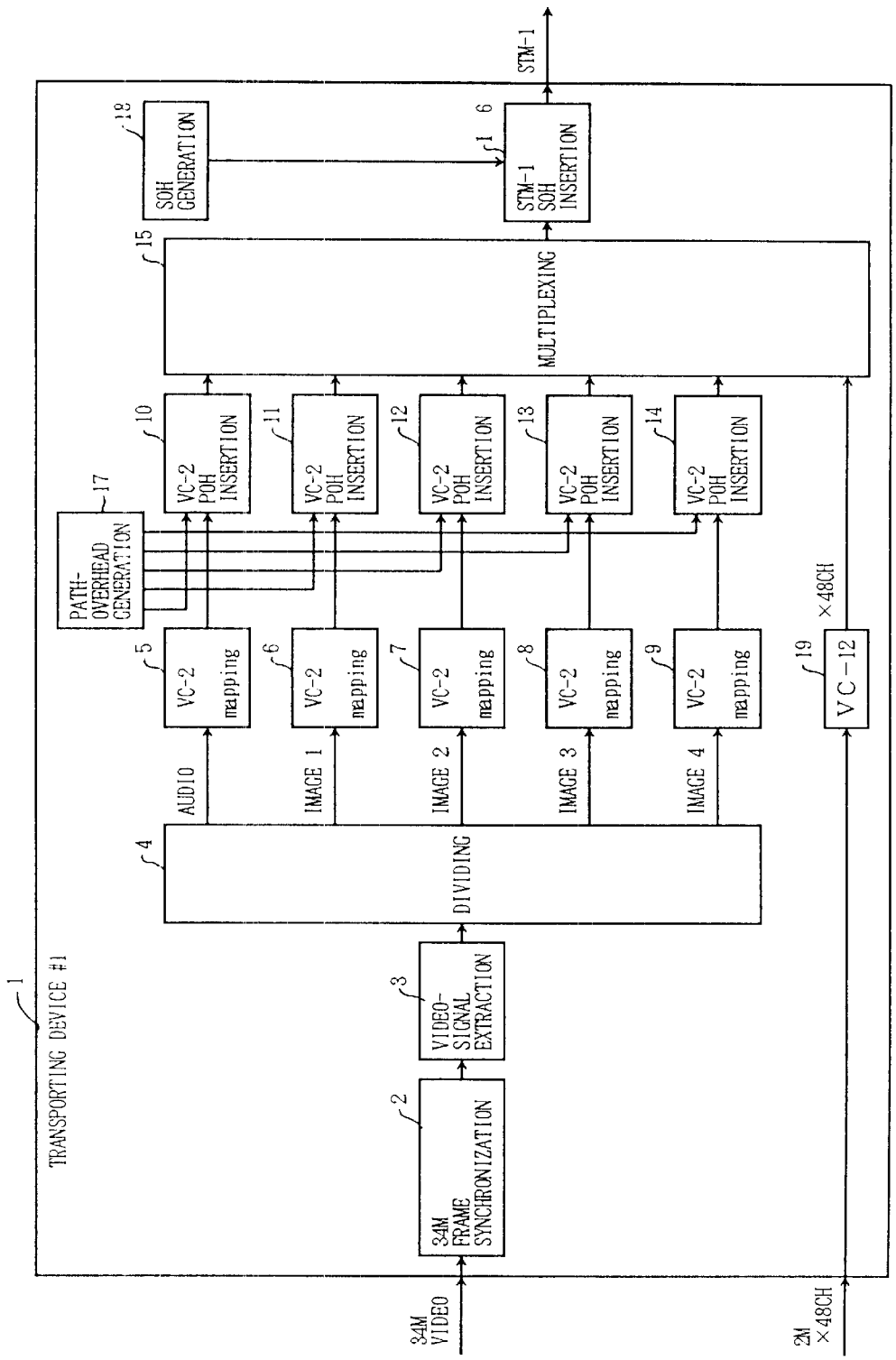
FIG. 8 is a block diagram of a related-art transporting device.

A hardware configuration of FIG. 9 is basically the same as that of FIG. 8. A difference is found, however, where a maintenance worker 21 makes a setting to a signal name (e.g., "VIDEO 1"), and uses a path-overhead-generation circuit 17 to set concatenation information in a path trace of the path overhead. The section overhead is the same as one that is conventionally used. Such a section overhead is generated by a section-overhead-generation circuit 18, and is inserted into the STM-1 by the STM-1SOH-insertion circuit 16.

In the first embodiment, a path trace of each channel has concatenation information described therein when a signal is distributed to a plurality of channels for signal transmission.

FIGS. 10A through 10E is an illustrative drawing showing examples of concatenation information described in a path trace of each channel.

In a path trace of a virtual container VC-2 of a channel CH1, information "VIDEO1__CH1__CH5" is described as shown in FIG. 10A. "VIDEO" included in this information indicates that an original signal of the channel CH1 is a first video signal "VIDEO". "CH1" represents a first channel of the first video signal, and "CH5" shows that the total number of channels for the first video signal is five. By the same token, the virtual containers VC-2 corresponding to channels CH2 through CH5 have a path trace that includes descriptive information as shown in FIG. 10B through FIG.

10E, respectively. Because of this information, it is known that the channels CH1 through CH5 share the first video signal, that the first video signal has been divided into five signals, and that first through fifth signals obtained by dividing the first video signal are conveyed by the channels CH1 through CH5, respectively.

If the fact that the first video signal is to be divided into five signals is stored beforehand in a memory device or the like, a channel number of each channel and the total number of channels can be generated automatically when the maintenance worker 21 sets the name of the first video signal ("VIDEO1"). In this case, therefore, the maintenance worker 21 can obtain signals as shown in FIG. 10A through FIG. 10E simply by entering the signal name.

Figure 11:
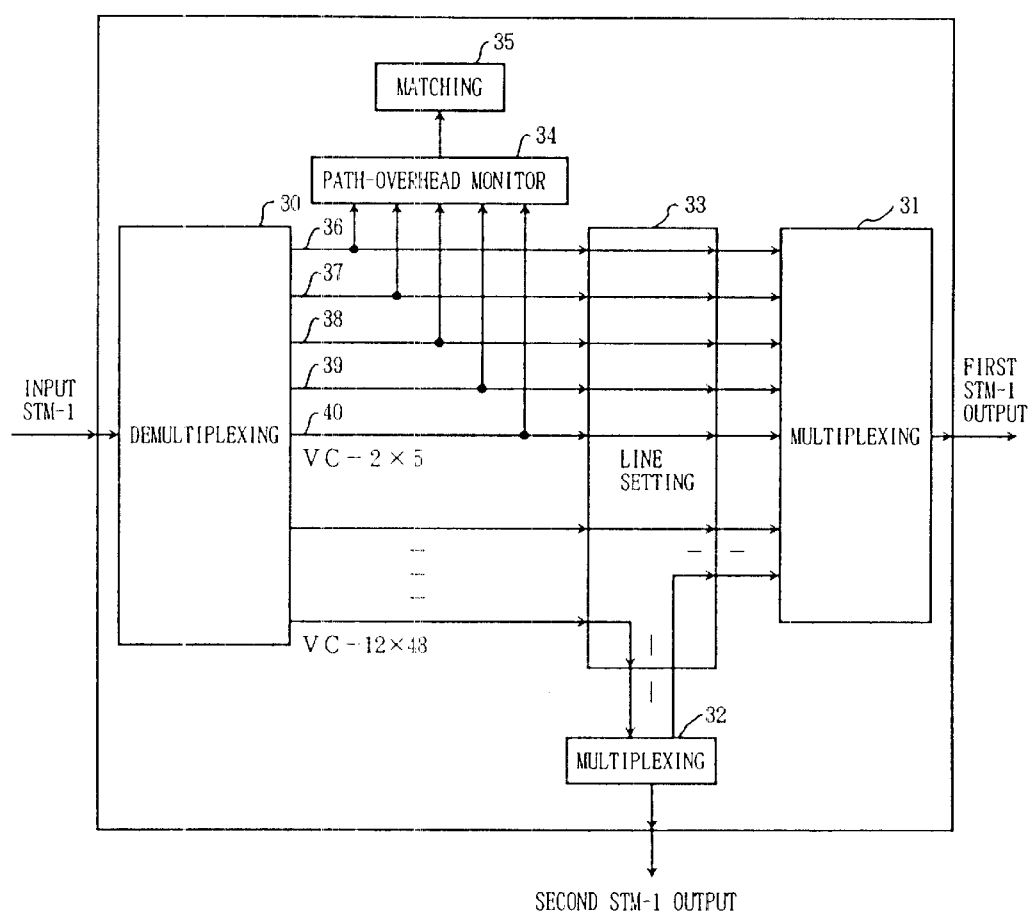
FIG. 11 is a block diagram of a transit transporting device according to the first embodiment of the present invention.

FIG. 11 is a block diagram of a transit transporting device according to the first embodiment of the present invention.

An STM-1 input signal is demultiplexed by a demultiplexing circuit 30. A splitting/insertion circuit 33 attends to signal splitting and signal insertion, so that first and second STM-1 outputs are supplied from multiplexing circuits 31 and 32, respectively.

A path-overhead monitor 34 monitors a path-overhead of each channel (VC-2), which is demultiplexed as described above. If line settings are such that lines 36 through 40 carry first through fifth signals obtained from the five-fold division of the first video signal, the path-overhead monitor 34 monitors signals shown in FIG. 10A through 10E as path-trace signals of the path overheads. If the actual line settings are different from the intended line settings, path trace signals that are different from those of FIG. 10A through 10E will be observed.

A matching circuit 35 compares the path trace signals of the path overheads with the intended line settings, thereby checking whether the actual line settings are correct. This makes it possible to detect errors of line settings or the like with respect to each transporting device.

Figure 12:
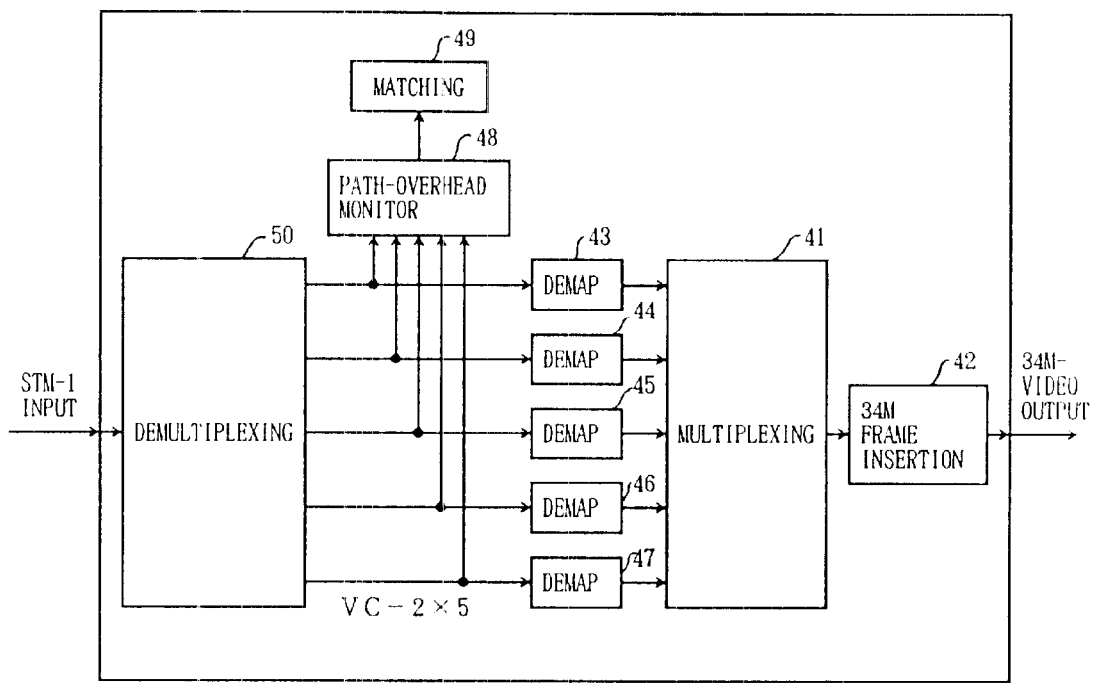
FIG. 12 is a block diagram of a transporting device to which a receiver terminal is connected according to the first embodiment of the present invention.

FIG. 12 is a block diagram of a transporting device to which a receiver terminal is connected according to the first embodiment of the present invention.

An STM-1 input signal is supplied to a demultiplexing circuit 50, demapping circuits (DEMAP) 43 through 47, a multiplexing circuit 41, and a 34-M-frame-synchronization insertion circuit 42, and is output as a 34-Mbps video signal. A path-overhead monitor 48 and a matching circuit 49 operate in the same manner and achieve the same function as the path-overhead monitor 34 and the matching circuit 35 of FIG. 11, respectively, and a description thereof will be omitted.

Second Embodiment

The first embodiment places concatenation information in the path trace of a path overhead. On the other hand, a second embodiment uses unused bytes in a path overhead for describing the concatenation information.

According to the second embodiment, a transporting device, to which a transmission terminal is connected, transmits a signal by distributing the signal to a plurality of channels and by describing in an unused portion of the path overhead of each channel that the channel is used as part of concatenated transmission. A transit transporting device or a transporting device to which a receiver device is connected receives an STM signal with an unused portion of the path overhead thereof including descriptive information that the channel is concatenated. This concatenation information is compared with the current line settings, so that a check is made as to the validity of the current line settings. In this manner, channels are controls.

A hardware configuration of the transporting device is identical to that of the first embodiment. Namely, the configuration of FIG. 9 can be used as a transporting device to which a transmission terminal is connected according to the second embodiment, and the configuration of FIG. 11 can be used as a transit transporting device of the second embodiment. Further, the configuration of FIG. 12 can be used as a transporting device of the second embodiment to which a receiver terminal is connected.

FIGS. 13A through 13F are illustrative drawings showing a signal configuration in which concatenation information is sent by using one byte in each channel.

In the figure, the concatenation information is comprised of a channel's own channel number and the total number of channels. Each of the channel's own channel number and the total number of channels is represented by binary decimals. If a given channel is not concatenated, the concatenation information has all the bits thereof set to zero.

Third Embodiment

The first and second embodiments place concatenation information in a path overhead. On the other hand, a third embodiment uses unused bytes in a section overhead for describing the concatenation information. A new section overhead is generated at each transit device each time the signal makes a transit. That is, each transit device needs to newly place concatenation information in a section overhead, and sends it each time the device serves as a transit point.

A hardware configuration of a transporting device to which a transmission terminal is connected is the same as that of the first and second embodiments. In the first and second embodiments, the maintenance worker 21 provides the concatenation information in a path overhead. In the third embodiment, on the other hand, the maintenance worker 21 provides the concatenation information in section overheads of multi frames of an STM-1 rather than providing the concatenation information in the path overhead.

Signals as shown in FIGS. 13A through 13F, for example, may be used as the concatenation information of this embodiment.

FIG. 14 is an illustrative drawing showing a 64-frame multi-frame configuration.

Concatenation information of this embodiment is included in each channel by using such a multi-frame configuration as shown in FIG. 14. In the case of the virtual container VC-2, concatenation information of the channel CH1 is stored in a first frame, and concatenation information of the channel CH2 is stored in a fourth frame. Remaining concatenation information for the channels CH3 through CH5 is stored in the same manner.

A channel which is virtually concatenated has valid concatenation information whereas a channel not virtually concatenated has concatenation information with all bits thereof set to zero.

Figure 15:
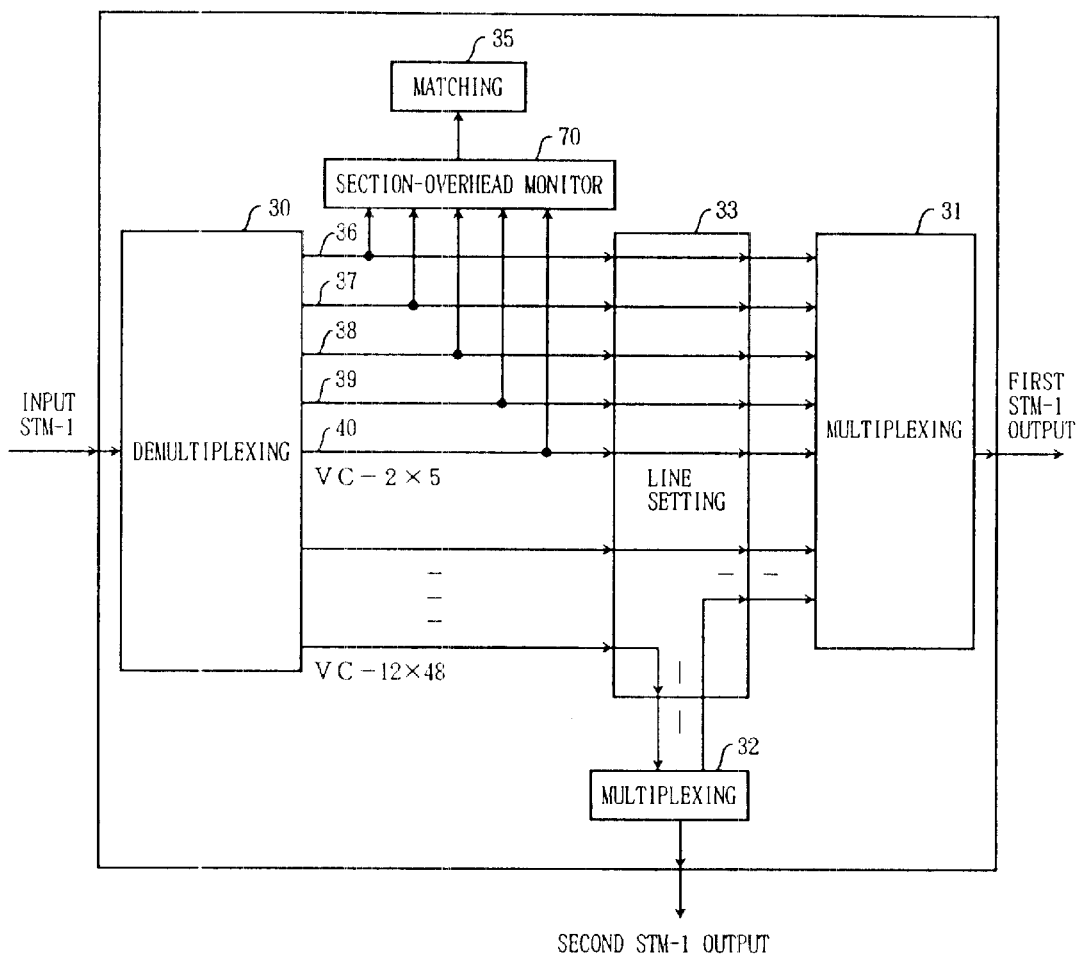
FIG. 15 is a block diagram of a transit transporting device according to a third embodiment of the present invention.
Figure 16:
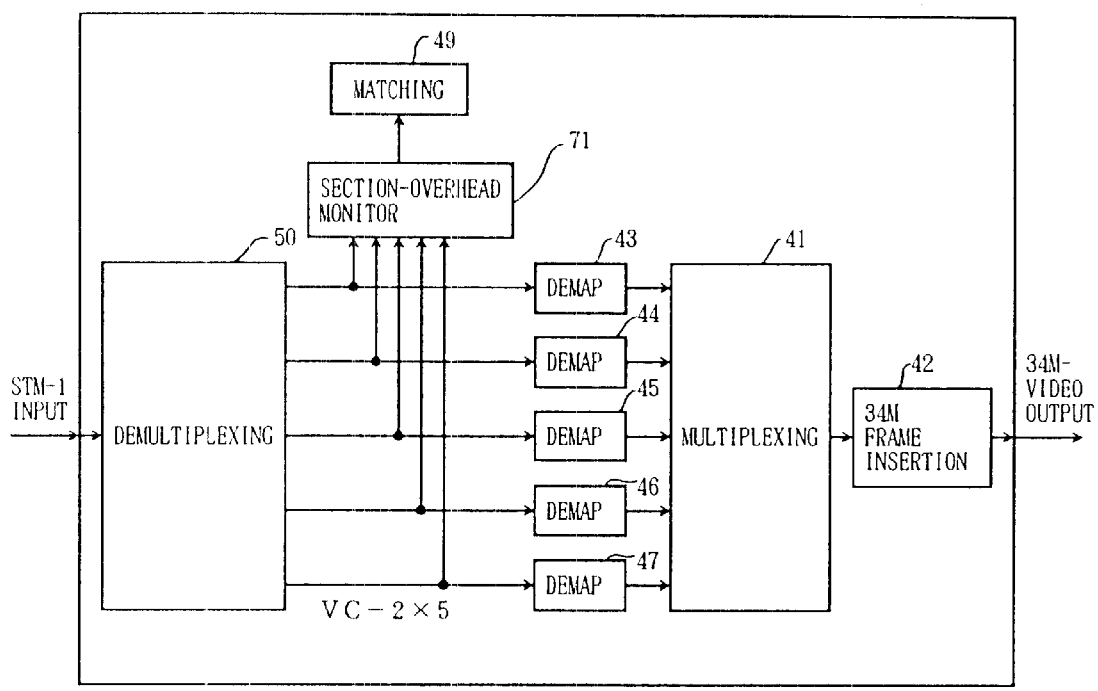
FIG. 16 is a block diagram of a transporting device to which a receiver terminal is connected according to the third embodiment of the present invention.

FIG. 15 is a block diagram of a transit transporting device according to the third embodiment of the present invention. FIG. 16 is a block diagram of a transporting device to which a receiver terminal is connected according to the third embodiment of the present invention.

Configurations of FIG. 15 and FIG. 16 according to the third embodiment differ from those of the transit transporting device of FIG. 11 and the transporting device of FIG. 12, respectively, of the first and second embodiments. Only differences are that section-overhead monitors 70 and 71 are provided in place of the path-overhead monitors. Operations of these devices are basically the same between the first and second embodiments and the third embodiment.

As described above, the concatenation information is included in a path overhead in the first and second embodiments, and is included in a section overhead in the third embodiment. A place where concatenation information can be provided is not limited to these particular embodiments. When a signal is distributed to a plurality of channels in an SDH network, information indicating a concatenated nature of a given channel may be included at any predetermined position within the channel or at any predetermined position within multi-frames containing the entirety of the channels.

Fourth Embodiment

When an STM signal is received along with concatenation information included in a path overhead of the channel, the concatenation information in the path overhead is compared with the current line settings. If there is a mismatch, an alarm goes off.

Figure 17:
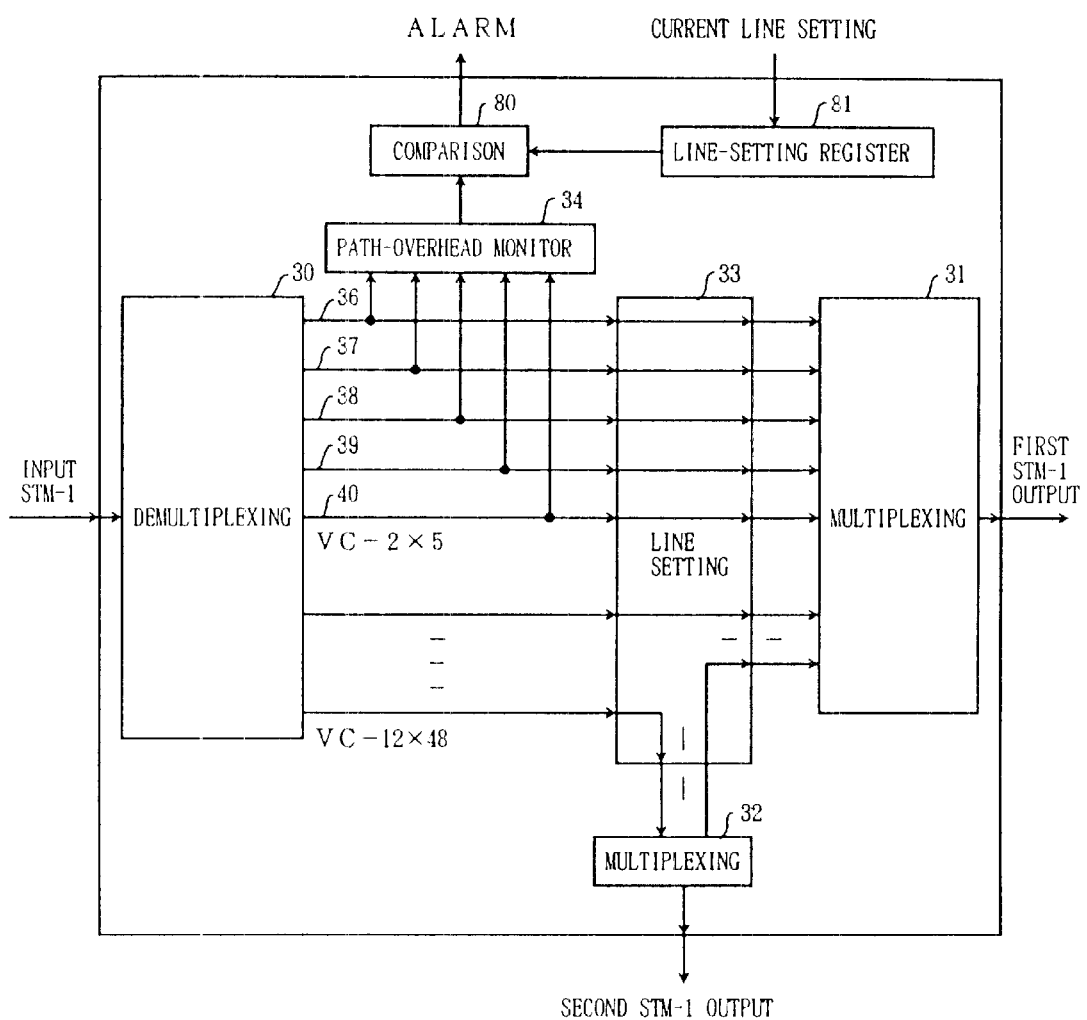
FIG. 17 is a block diagram of a transit transporting device according to a fourth embodiment of the present invention.
Figure 18:
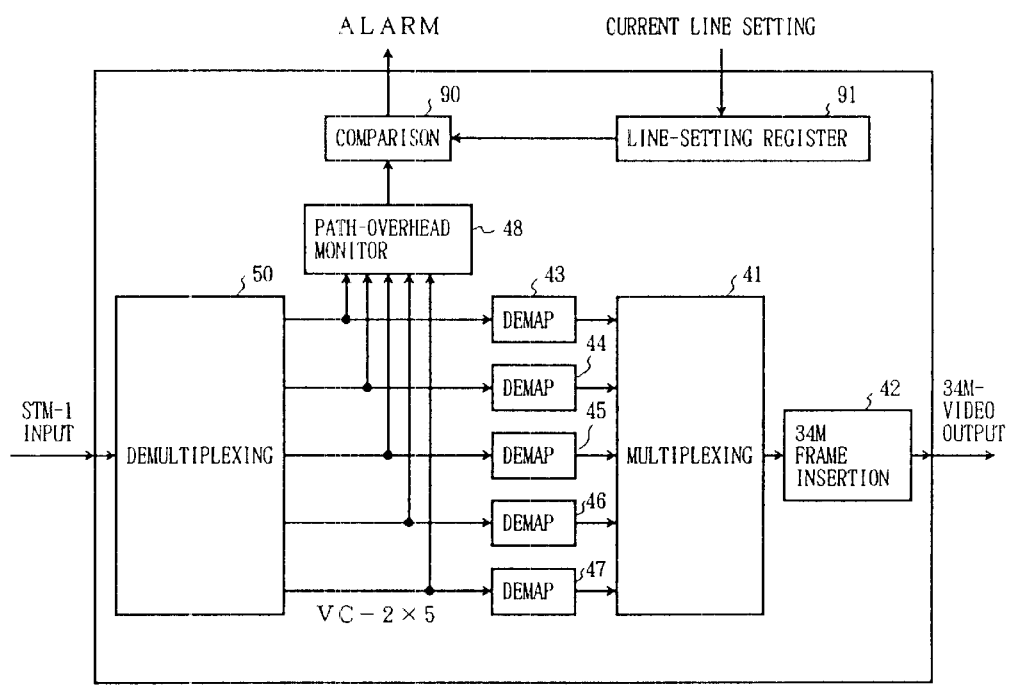
FIG. 18 is a block diagram of a transporting device to which a receiver terminal is connected according to the fourth embodiment of the present invention.

FIG. 17 is a block diagram of a transit transporting device according to the fourth embodiment of the present invention. FIG. 18 is a block diagram of a transporting device to which a receiver terminal is connected according to the fourth embodiment of the present invention. In FIG. 17 and FIG. 18, current line settings are stored in line-setting registers 81 and 91, and are compared with concatenation information from the path-overhead monitors 34 and 48 by comparison circuits 80 and 90, respectively. If no match is found, an alarm is output.

FIG. 19 is an illustrative drawing for explaining a situation where the alarm goes off.

In FIG. 19, a path overhead of the channel CH2 is not provided with such concatenation information as indicating a concatenated nature of the channel. If the current line settings show that the channel CH2 is concatenated to carry a second one of five signals respectively allocated to the five channels, an appropriate action is to let an alarm go off. In this manner, an error in communication-line settings can be easily detected.

In the above example, communication-line setting information is compared with concatenation information stored in a path overhead. Alternatively, if the concatenation information is included in a section overhead, the line setting information is compared with the concatenation information of the section overhead, of course. If no match is found, an alarm goes off.

Fifth Embodiment

Figure 20:
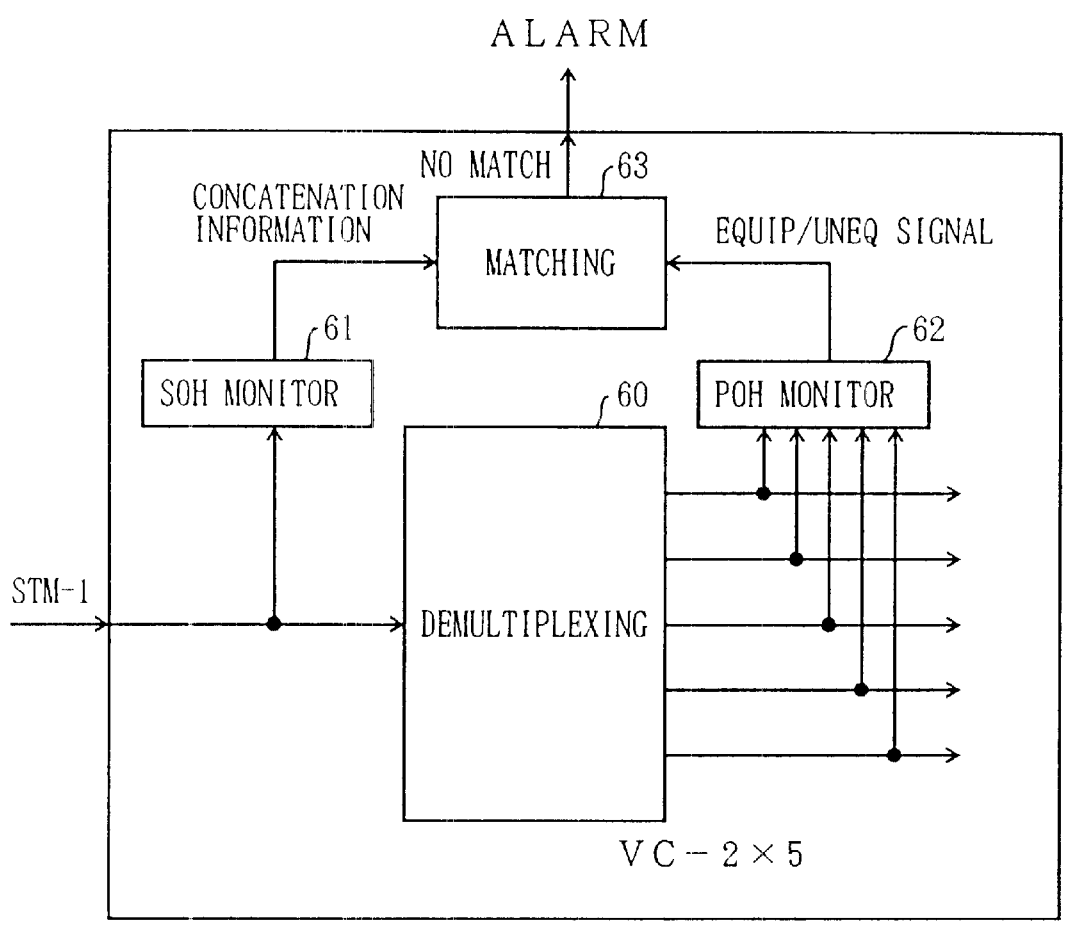
FIG. 20 is a block diagram of a transporting device according to a fifth embodiment of the present invention.

FIG. 20 is a block diagram of a transporting device according to a fifth embodiment of the present invention.

As shown in FIG. 20, a section-overhead monitor 61 detects concatenation information included in a section overhead while a path-overhead monitor 62 detects an EQIP/UNEQ signal included in a path overhead of each channel demultiplexed by a demultiplexing circuit 60. Information obtained by the section-overhead monitor 61 and information obtained by the path-overhead monitor 62 are compared with each other by a matching circuit 63. If there is not match, an alarm signal is output.

When the concatenation information of the section overhead indicates transmission of a signal but the EQIP/UNEQ signal in the path overhead indicates no transmission of any signal, the two pieces of information contradict with each other. This indicates some sort of problems concerning communication lines, so that an alarm signal is output.

FIG. 21 is an illustrative drawing for explaining cases in which an alarm goes off according to the fifth embodiment.

In FIG. 21, the channel CH2 has concatenation information indicating that the channel CH2 is carrying a second one of five signals respectively allocated to the five channels. To the contrary, the EQIP/UNEQ signal in the path overhead indicates that there is no signal (UNEQ) with respect to the channel CH2. In this case, an alarm signal is output.

In this manner, a consistency between a section overhead and a path overhead is checked all the time where the section overhead is rewritten at each section (i.e., at each transit transporting device) while the path overhead remains the same regardless of section changes. This check ensures a detection of errors which is made at the time of rewriting of a section overhead.

Conventionally, a check can be made only on a receiver side as to whether a correct signal is being transmitted with respect to each channel. The first through fifth embodiment of the present invention enables a transporting device to check whether all the channels are being transmitted via the same route as required by the line settings.

Accordingly, even when a large amount of data is distributed to a large number of channels, it is insured that every piece of data is transmitted through the same network route. This eliminates a need to attend to a timing adjustment and a level adjustment on a receiver side.

Further, the present invention is not limited to these embodiments, but various variations and modifications may be made without departing from the scope of the present invention.

The present application is based on Japanese priority application No. 10-187458 filed on Jul. 2, 1998, with Japanese Patent Office, the entire contents of which are hereby incorporated by reference.

What is claimed is:

1. A method of controlling virtually concatenated channels, comprising the steps of:
    a) distributing a signal to a plurality of channels in an SDH network so as to transmit the signal;
    b) providing information at a predetermined position within each one of the channels or at predetermined positions within multi-frames containing an entirety of the channels, said information indicating whether a corresponding one of the channels is concatenated;
    c) receiving at a receiver the signal distributed to the plurality of channels'
    d) comparing the information included in the received signal with communication-line settings; and
    e) signaling an alarm if the comparison finds that all the channels are not transmitted via single route.

2. The method as claimed in claim 1, wherein said step b) provides said information at a path trace of a path overhead of each channel.

3. The method as claimed in claim 1, wherein said step b) provides said information at an unused portion of a path overhead of each channel.

4. The method as claimed in claim 1, wherein said step b) provides said information at an unused portion of a section overhead of multi-frames containing the entirety of the channels.

5. The method as claimed in claim 4, further comprising the steps of:

receiving at a receiver the signal distributed to the plurality of channels;

comparing the information included in the received signal with EQIP/UNEQ signals included in path overheads of the plurality of channels; and signaling an alarm id the comparison finds a mismatch.

6. The method as claimed in claim 1, wherein said signal is a 34-Mbps video signal, and the plurality of channels are VC-2 virtual containers, said multi-frames including STM-1 frames.

7. A device for checking communication-line settings in an SDH network, comprising:

a concatenation-information detection circuit which obtains concatenation information from a signal that is received, the signal being distributed to a plurality of channels prior to receipt thereof and including the concatenation information provided at a predetermined position within multi-frames containing an entirety of the channels, said information indicating whether a corresponding one of the channels is concatenated;

a communication-line setting register which stores current communication-line settings; and a matching circuit which compares the concatenation information with the current communication-line settings, and signals an alarm when the comparison finds that all the channels are not transmitted via a single route.

8. A device for controlling virtually concatenated channels, comprising:

distributing means for distributing a signal to a plurality of channels in an SDH network so as to transmit the signal; and information providing means for providing information at a predetermined position within each one of the channels or at predetermined positions within multi-frames containing an entirety of the channels, said information indicating whether a corresponding one of the channels is concatenated, and provided for comparison with communication-line settings on a receiver side that signals an alarm if the comparison finds that all the channels are not transmitted via a single route.

9. The device as claimed in claim 8, wherein said information providing means provides said information at a path trace of a path overhead of each channel.

10. The device as claimed in claim 8, wherein said information providing means provides said information at an unused portion of a path overhead of each channel.

11. The device as claimed in claim 8, wherein said information providing means provides said information at an unused portion of a section overhead of multi-frames containing the entirety of the channels.

\* \* \* \* \*

UNITED STATES PATENT AND TRADEMARK OFFICE
CERTIFICATE OF CORRECTION

PATENT NO. : 6,667,989 B1
DATED : December 23, 2003
INVENTOR(S) : R. Sekii et al.

It is certified that error appears in the above-identified patent and that said Letters Patent is hereby corrected as shown below:

Title page,
Item [56], References Cited, FOREIGN PATENT DOCUMENTS, please add the following:

-- 05-252162 (JP) September 28, 1993, NEC CORP --

Signed and Sealed this

Twentieth Day of April, 2004

JON W. DUDAS
*Acting Director of the United States Patent and Trademark Office*